(12) United States Patent
Kumar et al.

(10) Patent No.: US 10,601,664 B2
(45) Date of Patent: Mar. 24, 2020

(54) DYNAMIC NETWORK AND SECURITY POLICY FOR IOT DEVICES

(71) Applicant: Cisco Technology, Inc., San Jose, CA (US)

(72) Inventors: Kannan Kumar, San Jose, CA (US); Brian E. Weis, San Jose, CA (US); Rashmikant B. Shah, San Jose, CA (US); Manoj Kumar Nayak, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 296 days.

(21) Appl. No.: 15/582,294

(22) Filed: Apr. 28, 2017

(65) Prior Publication Data
US 2018/0316563 A1 Nov. 1, 2018

(51) Int. Cl.
*H04L 12/24* (2006.01)
*H04L 29/06* (2006.01)
(Continued)

(52) U.S. Cl.
CPC ...... *H04L 41/0893* (2013.01); *H04L 41/0853* (2013.01); *H04L 41/5051* (2013.01);
(Continued)

(58) Field of Classification Search
CPC ............ H04L 41/0853; H04L 41/0893; H04L 41/5051; H04L 63/029; H04L 63/101;
(Continued)

(56) References Cited

U.S. PATENT DOCUMENTS 8,909,751 B2 12/2014 Fortier et al.
10,084,643 B2 * 9/2018 Zhang .................... H04W 4/70
(Continued)

OTHER PUBLICATIONS

Lear, et al., "Manufacturer Usage Description Specification", Network Working Group Internet-Draft, <draft-ietf-opsawg-mud-01>, Sep. 29, 2016, 36 pages, Internet Engineering Task Force Trust. "Provisioning", IoTivity Wiki, https://wiki.iotivity.org/provisioning, Accessed on Nov. 21, 2016, 14 pages, IoTivity.

*Primary Examiner* — Davoud A Zand
(74) *Attorney, Agent, or Firm* — Behmke Innovation Group LLC; James Behmke; Stephen D. LeBarron

(57) ABSTRACT

In one embodiment, a network controller for a computer network receives details of a provisioned device and policy requirements for the provisioned device. The network controller may then determine, based on the details and policy requirements for the provisioned device, a plurality of network devices that the provisioned device is configured to communicate through, and may then translate the details and policy requirements for the provisioned device into a plurality of network-device-specific policies, each respective network-device-specific policy corresponding to one of the plurality of network devices that the provisioned device is configured to communicate through. As such, the network controller may then transmit a respective network-device-specific policy of the plurality of network-device-specific policies to the plurality of network devices that the provisioned device is configured to communicate through.

20 Claims, 4 Drawing Sheets

(51) Int. Cl.
  *H04W 12/10* (2009.01)
  *H04L 29/08* (2006.01)
  *H04W 4/50* (2018.01)
  *H04W 12/08* (2009.01)
  *H04W 12/00* (2009.01)
  *H04W 4/70* (2018.01)

(52) U.S. Cl.
  CPC ......... *H04L 63/20* (2013.01); *H04W 12/1002* (2019.01); *H04L 63/029* (2013.01); *H04L 63/101* (2013.01); *H04L 67/12* (2013.01); *H04W 4/50* (2018.02); *H04W 4/70* (2018.02); *H04W 12/0023* (2019.01); *H04W 12/0808* (2019.01)

(58) Field of Classification Search
  CPC .... H04L 63/20; H04L 67/12; H04W 12/0023; H04W 12/0808; H04W 12/1002; H04W 4/50; H04W 4/70
  See application file for complete search history.

(56) References Cited

U.S. PATENT DOCUMENTS

| | | |
|---|---|---|
| 2016/0128043 A1 | 5/2016 | Shuman et al. |
| 2016/0173495 A1 | 6/2016 | Joo |
| 2016/0285979 A1 | 9/2016 | Wang et al. |
| 2017/0093700 A1* | 3/2017 | Gilley ..................... H04L 45/44 |
| 2017/0230817 A1* | 8/2017 | Ryu ........................ H04W 8/02 |
| 2018/0247188 A1* | 8/2018 | Wong ....................... G06N 3/08 |

* cited by examiner

DYNAMIC NETWORK AND SECURITY POLICY FOR IOT DEVICES

TECHNICAL FIELD

The present disclosure relates generally to computer networks, and, more particularly, to a dynamic network and security policy for Internet of Things (IoT) devices.

BACKGROUND

The Internet of Things (IoT) presents new challenges to network and security policies, given the vast number of devices, their generally minimalistic sophistication, and their supposed ease of use (e.g., "plug and play"). Various protocols try to limit the access of IoT devices to the network, especially since an IoT device typically has a limited number of servers to which it must communicate. However, with numerous IoT devices, which each class of device communicating using different methods, it is impossible to have a predefined static access control policy throughout the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
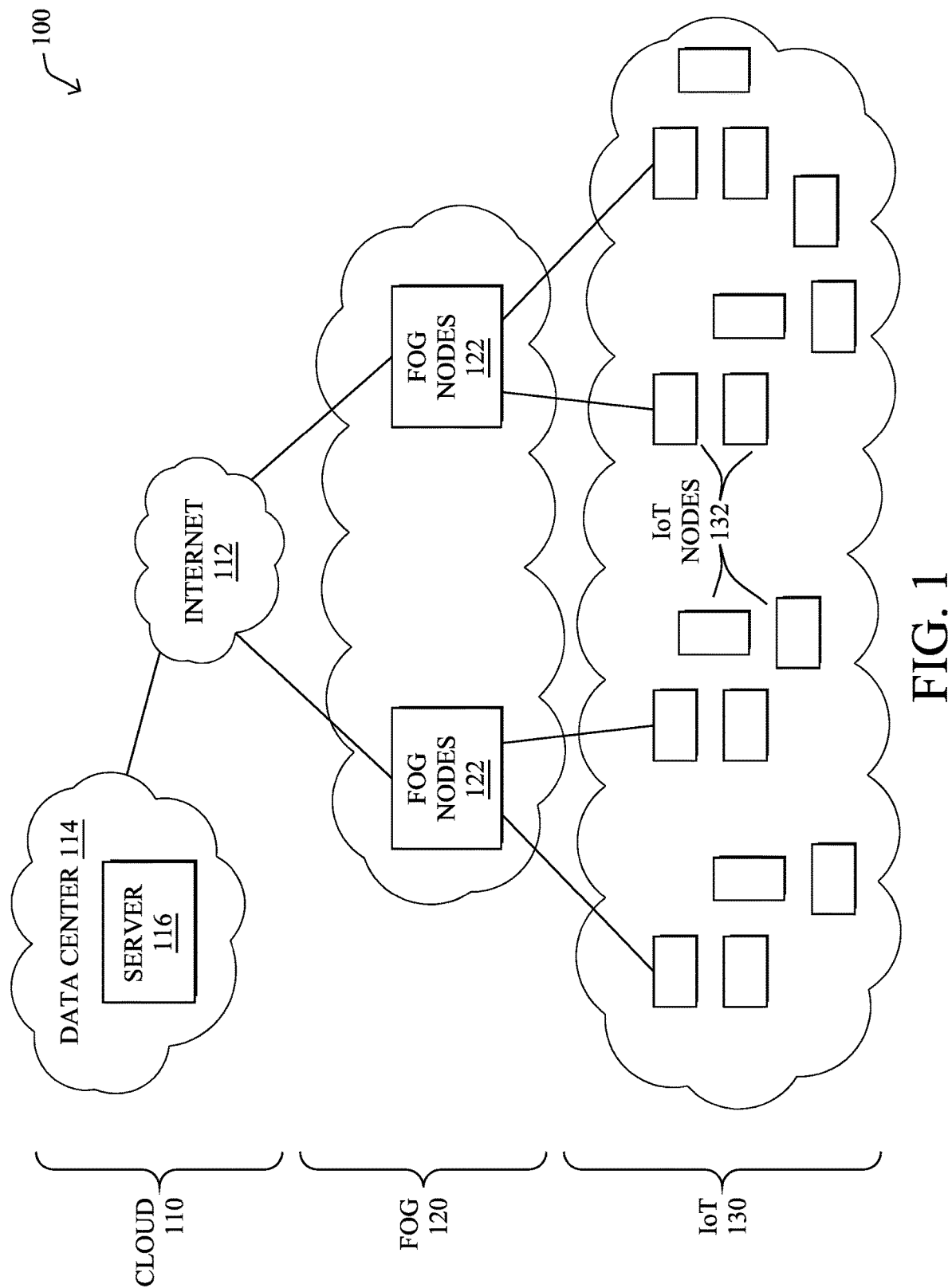
FIG. 1 illustrates an example computer network.

According to one or more embodiments of the disclosure, a network controller for a computer network receives details of a provisioned device (e.g., an Internet of Things or IoT device) and policy requirements for the provisioned device (e.g., based on a Manufacturer Usage Description (MUD) protocol exchange). The network controller may then determine, based on the details and policy requirements for the provisioned device, a plurality of network devices that the provisioned device is configured to communicate through, and may then translate the details and policy requirements for the provisioned device into a plurality of network-device-specific policies, each respective network-device-specific policy corresponding to one of the plurality of network devices that the provisioned device is configured to communicate through. As such, the network controller may then transmit a respective network-device-specific policy of the plurality of network-device-specific policies to the plurality of network devices that the provisioned device is configured to communicate through.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, optionally across multiple fog layers, as described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations or tenants.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
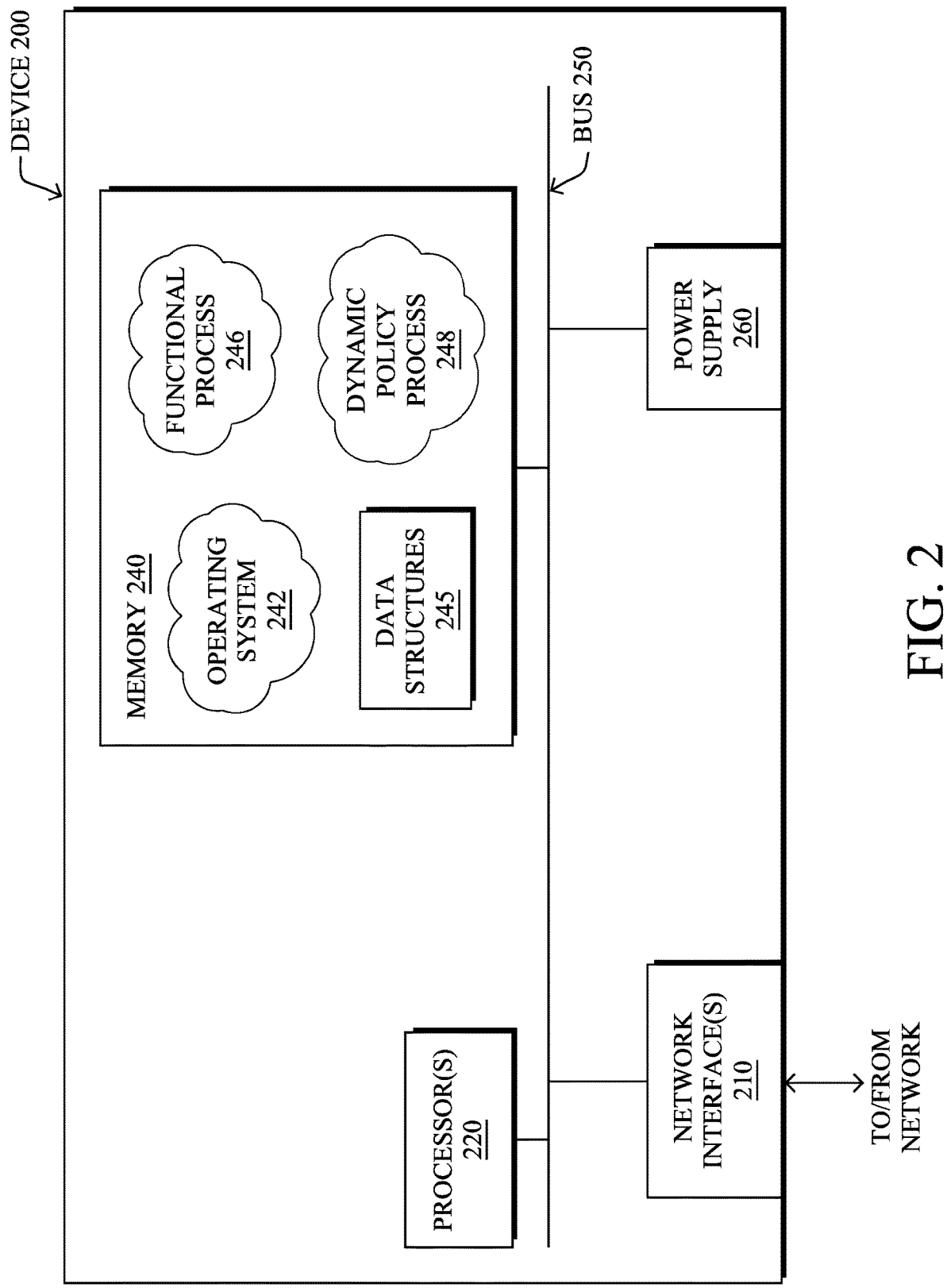
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "dynamic policy" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Dynamic Network and Security Policy for IoT Devices

As noted above, IoT networks present new challenges to network and security policies. In particular, the Manufacturer Usage Description (MUD) Specification (draft-lear-ietf-netmod-mud-04) describes how a policy engine/authentication server can harvest a MUD uniform resource identifier (URI) presented by an Internet of Things (IoT) device. It then resolves the MUD URI and creates network policy for the IoT device, and forwards the access policy to the access port to which the IoT device is attached. This effectively limits the access of the IoT device to the network.

An IoT device typically has a limited number of servers to which it must communicate. Most times there is a need to apply policy relating to the device (or class of devices) on the path between the IoT device and its servers. Enterprise network and security devices along this path of communication need to be provisioned with the right quality of service, firewall pinhole, or other types of network or security policy. With numerous IoT devices, which each class of device communicating using different methods, it is impossible to have a predefined static access control policy throughout the network.

Furthermore, it is often not possible to determine in advance to which access ports that IoT devices will be connected. However, once the device shows up on the network a Network/Security Controller (e.g., APIC-EM) has a record of the state of the network and can predict which paths the communication should take between the IoT device and its servers. But there is no way for it to dynamically know which device should have policy for which IoT devices assigned, even if it knows the legitimate paths for the IoT device packets.

The techniques herein, therefore, propose a mechanism for network and security devices to dynamically learn the access control policy for IoT devices using information derived from a MUD file describing the network characteristics of a device, and then to install relevant policy along the legitimate paths between the IoT device and the servers to which it is authorized to communicate. In particular, though the MUD specification provides advice to end network on how to treat specific classes of devices, what policies to be applied, etc., this does not solve the problem of allowing IoT communication by defining required policy on other network and security devices. The techniques herein, on the other hand, dynamically deploy specific access control or other policy requirements on multiple network and security devices across the network as an extension to the standard IoT device provisioning process.

Specifically, according to one or more embodiments of the disclosure as described in detail below, a network controller for a computer network receives details of a provisioned device (e.g., an Internet of Things or IoT device) and policy requirements for the provisioned device (e.g., based on a Manufacturer Usage Description (MUD) protocol exchange). The network controller may then determine, based on the details and policy requirements for the provisioned device, a plurality of network devices that the provisioned device is configured to communicate through, and may then translate the details and policy requirements for the provisioned device into a plurality of network-device-specific policies, each respective network-device-specific policy corresponding to one of the plurality of network devices that the provisioned device is configured to communicate through. As such, the network controller may then transmit a respective network-device-specific policy of the plurality of network-device-specific policies to the plurality of network devices that the provisioned device is configured to communicate through.

Illustratively, the techniques described herein may be performed by hardware, software, and/or firmware, such as in accordance with the dynamic policy process 248, which may include computer executable instructions executed by the processor 220 to perform functions relating to the techniques described herein, e.g., in conjunction with corresponding processes of other devices in the computer network as described herein.

Figure 3:
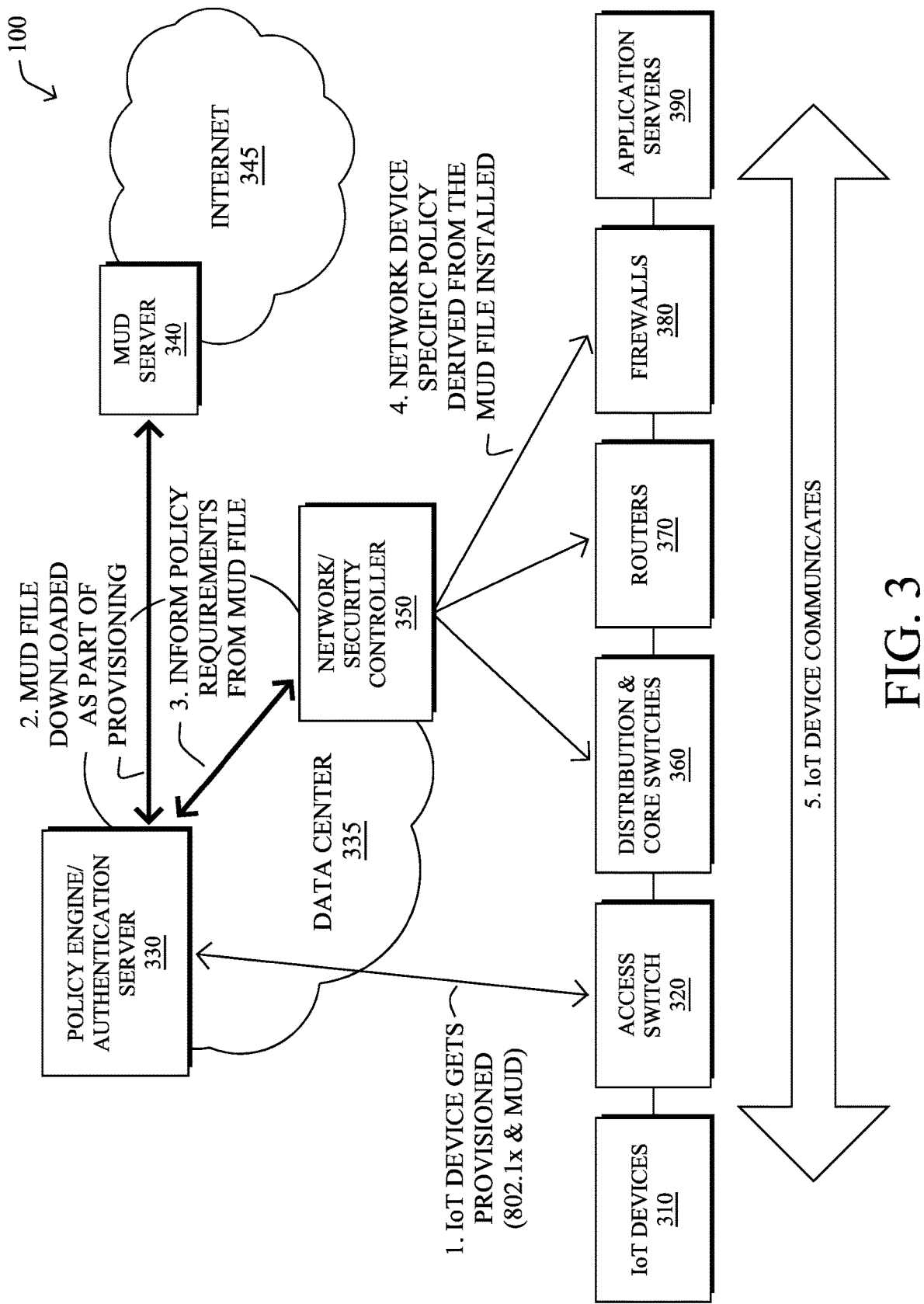
FIG. 3 illustrates an example of providing a dynamic network and security policy for devices (e.g., IoT devices)

FIG. 3 illustrates a detailed network view 300 in accordance with one or more embodiments described herein, where devices (e.g., IoT devices) 310 communicate with the network 300 through an access point/switch 320 to reach the rest of the network. (Note that IoT devices may have wireless and/or wired access to the network. As such, though the network access point is shown in FIG. 3 as an access switch 320, those skilled in the art will understand that device 320 could be an access switch, wireless access point, gateway, etc.)

From a network administration perspective, IoT devices 310 are generally considered less trustworthy that other network devices (e.g., distribution/core switches 360, routers 370, firewalls 380, etc.), and can be subjected to exploits. Although it can be expected that access control (e.g., access control lists or "ACLs") have been applied at the access port (of access switch 320), there is a need for granular policy at every layer on the network to make sure that only IoT devices can communicate with the application server(s) 390. For example, a firewall 380 in front of the application servers to which the IoT device are supposed to talk could benefit from a finer grained policy than "allow any device to send packets to the server". A far safer policy would be for the firewall to constrain access to the servers to just the IoT devices that are provisioned securely and also can deny access to other enterprise servers not relevant to those devices.

With a wide range of IoT devices it is very difficult for the network administrators to know its exact purpose and the required access control policy. All the devices across the network would thus benefit from dynamically learning the specific policy required for an IoT device while it gets provisioned to the network (e.g., according to the illustrative MUD protocol exchange).

Operationally, therefore, the present disclosure provides a technique (e.g., illustrated as steps "1-5" in FIG. 3 and described below) to achieve the desired outcome mentioned above.

1. IoT Device Provisioning/On-Boarding: IoT devices may be authorized to join a network by performing a provisioning protocol exchange, such as the illustrative MUD protocol exchange. For example, the IEEE standard 802.1X may be performed, where the provisioning device uses its IEEE 802.1AR Initial Device Identifier (IDevID) or Locally Significant Device Identifier (LDevID) that contains a MUD URI. Device on-boarding could also be achieved using Dynamic Host Configuration Protocol (DHCP) or Link Layer Discovery Protocol (LLDP) packets carrying the MUD URI rather than using a certificate. In this case the access switch 320 would retrieve the MUD URI from these packets and send to the Policy Engine 330 within a relevant datacenter 335 (e.g., through "RADIUS", as understood in the MUD protocol—The "RADIUS" packets may be known as media access control (MAC) authentication bypass (MAB) packets).

2. MUD File Download: At the end of the on-boarding process the AAA/Policy engine 330 would have received the MUD File from the MUD Server 340 (from somewhere within the Internet 345). The MUD file contains details of the network policy for effective IoT device functioning which could be access levels, bandwidth, and any other network or security requirements. Notably, the techniques herein may extend the usage of MUD file to contain detailed IoT device network policy requirements.

3. Controller Gets Policy: The policy engine 330 send details of the provisioned IoT device and policy requirements from the MUD File to the Network/Security controller 350 (e.g., of a particular segmentation area/domain). This may be achieved through an existing communication channel between the Policy Engine 330 and the Controller 350.

4. Controller Provisions the Network: The Network/Security Controller 350 (e.g., an Application Policy Infrastructure Controller—Enterprise Module (APIC-EM)), which manages network policy (e.g., for an enterprise) may then translate the received IoT device policy requirements to network/security device-specific policies. The controller will then push the relevant policy to the required network and security devices on the path between the IoT device and its application servers 390. Note that any network or security policy required for the IoT devices may be provisioned through this approach. For example, as shown in FIG. 3, the controller 350 could provision:

ACL on the distribution and core switches 360;
ACL and quality-of-service (QoS) policy on the routing devices 370; and/or
Security policy on the respective firewall devices 380.

5. IoT Device Communicates: The IoT device 310 starts its communication and all the network devices on the path will have the right policy provisioned for effective and secured functioning of the IoT device.

With this multi layered IoT device specific policy deployment approach the network is much more secured from the numerous IoT devices that could be deployed.

Figure 4:
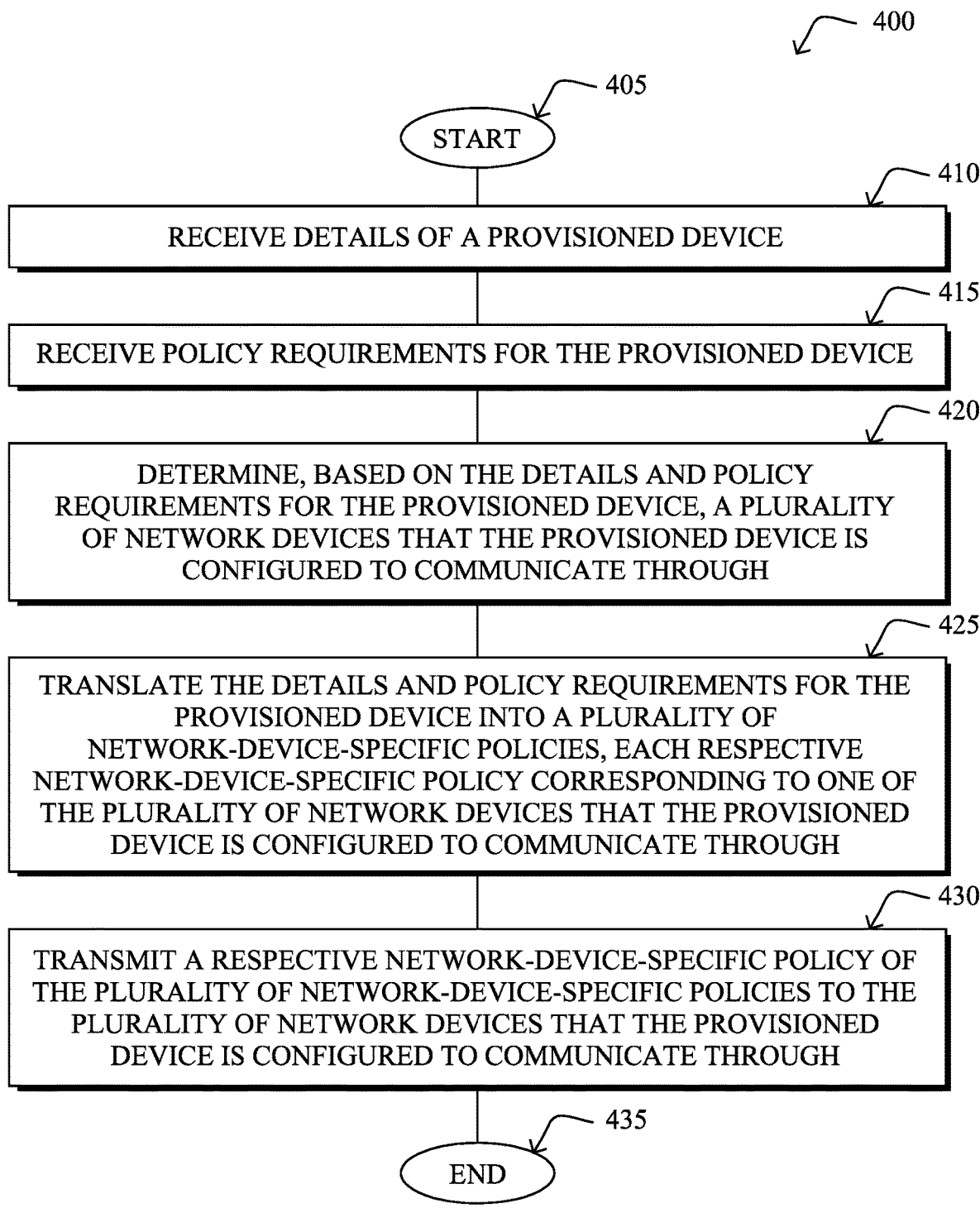
FIG. 4 illustrates an example simplified procedure for providing a dynamic network and security policy for devices (e.g., IoT devices).

FIG. 4 illustrates an example simplified procedure for providing a dynamic network and security policy for devices (e.g., IoT devices) in accordance with one or more embodiments described herein. For example, a non-generic, specifically configured device (e.g., device 200, such as a network controller 350) may perform procedure 400 by executing stored instructions (e.g., process 248). The procedure 400 may start at step 405, and continues to step 410, where, as described in greater detail above, a network controller 350 receives details of a provisioned device (e.g., IoT device 310) and then to step 415 to also receive policy requirements for the provisioned device (optionally, at the same time as step 410). In particular, as described above, the details and policy requirements for the provisioned device may be based on a MUD protocol exchange of the provisioned device, and in one embodiment, receiving the details and policy requirements for the provisioned device is based on receiving a communication from a policy engine 330 that is located along a provisioning path between the provisioned device and a provisioning server 340 (e.g., a MUD server to provision or on-board the IoT device according to MUD protocol operation). In general, the details may be any useful characteristic of the device 310, such as, e.g., an identification (ID), an Internet Protocol (IP) address, a media access control (MAC) address, a type, a class, a manufacturer, and so on. Also, policy requirements may be such things as, e.g., an access level, a bandwidth requirement, and a quality-of-service (QoS) requirement, etc.

In step 420, the network controller may determine, based on the details and policy requirements for the provisioned device, a plurality of network devices that the provisioned device is configured to communicate through. For instance, network devices, such as distribution/core switches 360, routers 370, firewalls, 380, and optionally servers 390 may be determined based on first determining a path from the provisioned device to one or more application servers 390 that the provisioned device is configured to communicate with (e.g., that are specific to the operation of the device)

In step 425, the network controller may then translate the details and policy requirements for the provisioned device into a plurality of network-device-specific policies, where each respective network-device-specific policy corresponds to one of the plurality of network devices that the provisioned device is configured to communicate through. For example, as mentioned above, switch policies may be created for switches, routing policies may be created for routers, firewall policies may be created for firewalls, and so on. Examples of network-device-specific policies are, among others, access control list (ACL) entries, QoS requirements, security policies, etc.

Accordingly, in step 430, the network controller may then transmit (push) a respective network-device-specific policy (of the plurality of network-device-specific policies) to the plurality of network devices that the provisioned device is configured to communicate through. In this manner, as described above, communication from the device to the appropriate application server(s) can then occur through network devices on the path that have corresponding device-specific policies for effective and secured functioning of the device.

The illustrative procedure 400 may then end in step 435, though notably with the option to receive further or updated details or policies for provisioned devices, and to update the appropriate network devices, accordingly.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a dynamic network and security policy for IoT devices. In particular, the techniques herein increase security by deploying granular network and security policy at various (e.g., every) layer of the network when the IoT device is provisioned, and simplify network management as the policies are configured dynamically without manual intervention, thus avoiding human error or forgotten configurations. Further, any networking vendor can use this approach as part of their solution for customers to secure the network while deploying IoT devices, expanding the current capabilities of the MUD protocol, particularly allowing MUD to be translated into local relevance (what matters for what local devices, etc.). Note that unlike current "group-based" policies, the techniques herein not only establish "device-based" policies, but also establish them specifically per network device along the path for a specific IoT device to communicate with its application server(s).

While there have been shown and described illustrative embodiments that provide for dynamic network and security policy for IoT devices, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. Moreover, while specific protocols and associated devices have been such, such as MUD, other suitable protocols may be used in accordance with the techniques described above. In addition, while certain devices are shown, such as routers, access points, gateways, firewalls, etc., other suitable devices may be used, accordingly. That is, the embodiments have been shown and described herein with relation to specific network configurations (orientations, topologies, protocols, terminology, etc.). However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a network controller for a computer network, details of a provisioned device;
receiving, at the network controller, policy requirements for the provisioned device;
determining, by the network controller based on the details and policy requirements for the provisioned device, a plurality of network devices along a path that the provisioned device is configured to communicate through, wherein the path is from the provisioned device to one or more application services that the provisioned device is configured to communicate with;
translating, by the network controller, the details and policy requirements for the provisioned device into a plurality of network-device-specific policies, each respective network-device-specific policy corresponding to one of the plurality of network devices along the path that the provisioned device is configured to communicate through; and
transmitting, from the network controller, a respective network-device-specific policy of the plurality of network-device-specific policies to the plurality of network devices along the path that the provisioned device is configured to communicate through.

2. The method as in claim 1, wherein determining the plurality of network devices that the provisioned device is configured to communicate through comprises:
determining the path from the provisioned device to the one or more application services that the provisioned device is configured to communicate with; and
determining the plurality of network devices based on the path.

3. The method as in claim 1, wherein the details and policy requirements for the provisioned device are based on a Manufacturer Usage Description (MUD) protocol exchange of the provisioned device.

4. The method as in claim 1, wherein receiving the details and policy requirements for the provisioned device comprises:
receiving a communication from a policy engine that is located along a provisioning path between the provisioned device and a provisioning server.

5. The method as in claim 4, wherein the provisioned device is provisioned according to a Manufacturer Usage Description (MUD) protocol exchange with the provisioning server.

6. The method as in claim 1, wherein the provisioned device is an Internet of Things (IoT) device.

7. The method as in claim 1, wherein the plurality of network devices that the provisioned device is configured to communicate through are selected from a group consisting of: distribution switches; core switches; routers; firewalls; and servers.

8. The method as in claim 1, wherein the details of the provisioned device are selected from a group consisting of: an identification (ID) of the provisioned device; an Internet Protocol (IP) address of the provisioned device; a media access control (MAC) address of the provisioned device; a type of the provisioned device; a class of the provisioned device; and a manufacturer of the provisioned device.

9. The method as in claim 1, wherein the policy requirements for the provisioned device are selected from a group consisting of: an access level for the provisioned device; a bandwidth requirement for the provisioned device; and a quality-of-service (QoS) requirement for the provisioned device.

10. The method as in claim 1, wherein the plurality of network-device-specific policies are selected from a group consisting of: an access control list (ACL) entry for the provisioned device; a quality-of-service (QoS) requirement for the provisioned device; and a security policy for the provisioned device.

11. An apparatus, comprising:
one or more network interfaces configured to communicate in a computer network;
a processor coupled to the network interfaces and adapted to execute one or more processes; and
a memory configured to store a process executable by the processor, the process when executed operable to:
receive details of a provisioned device;
receive policy requirements for the provisioned device;
determine, based on the details and policy requirements for the provisioned device, a plurality of network devices along a path that the provisioned device is configured to communicate through, wherein the path is from the provisioned device to one or more application services that the provisioned device is configured to communicate with;
translate the details and policy requirements for the provisioned device into a plurality of network-device-specific policies, each respective network-device-specific policy corresponding to one of the plurality of network devices along the path that the provisioned device is configured to communicate through; and
transmit a respective network-device-specific policy of the plurality of network-device-specific policies to the plurality of network devices along the path that the provisioned device is configured to communicate through.

12. The apparatus as in claim 11, wherein process when executed to determine the plurality of network devices that the provisioned device is configured to communicate through is further operable to:
determine the path from the provisioned device to the one or more application services that the provisioned device is configured to communicate with; and
determine the plurality of network devices based on the path.

13. The apparatus as in claim 11, wherein the details and policy requirements for the provisioned device are based on a Manufacturer Usage Description (MUD) protocol exchange of the provisioned device.

14. The apparatus as in claim 11, wherein the process when executed to receive the details and policy requirements for the provisioned device is further operable to:
receive a communication from a policy engine that is located along a provisioning path between the provisioned device and a provisioning server.

15. The apparatus as in claim 14, wherein the provisioned device is provisioned according to a Manufacturer Usage Description (MUD) protocol exchange with the provisioning server.

16. The apparatus as in claim 11, wherein the provisioned device is an Internet of Things (IoT) device.

17. The apparatus as in claim 11, wherein the plurality of network devices that the provisioned device is configured to communicate through are selected from a group consisting of: distribution switches; core switches; routers; firewalls; and servers.

18. A tangible, non-transitory, computer-readable medium storing program instructions that cause a computer to execute a process comprising:

receiving details of a provisioned device;

receiving policy requirements for the provisioned device;

determining, based on the details and policy requirements for the provisioned device, a plurality of network devices along a path that the provisioned device is configured to communicate through, wherein the path is from the provisioned device to one or more application services that the provisioned device is configured to communicate with;

translating the details and policy requirements for the provisioned device into a plurality of network-device-specific policies, each respective network-device-specific policy corresponding to one of the plurality of network devices along the path that the provisioned device is configured to communicate through; and transmitting a respective network-device-specific policy of the plurality of network-device-specific policies to the plurality of network devices along the path that the provisioned device is configured to communicate through.

19. The computer-readable medium as in claim 18, wherein the process when executed to determine the plurality of network devices that the provisioned device is configured to communicate through further comprises:

determining the path from the provisioned device to the one or more application servers that the provisioned device is configured to communicate with; and determining the plurality of network devices based on the path.

20. The method as in claim 18, wherein the details and policy requirements for the provisioned device are based on a Manufacturer Usage Description (MUD) protocol exchange of the provisioned device, and wherein the process when executed to receive the details and policy requirements for the provisioned device comprises:

receiving a communication from a policy engine that is located along a provisioning path between the provisioned device and a MUD provisioning server.

* * * * *